United States Patent Office 3,817,803
Patented June 18, 1974

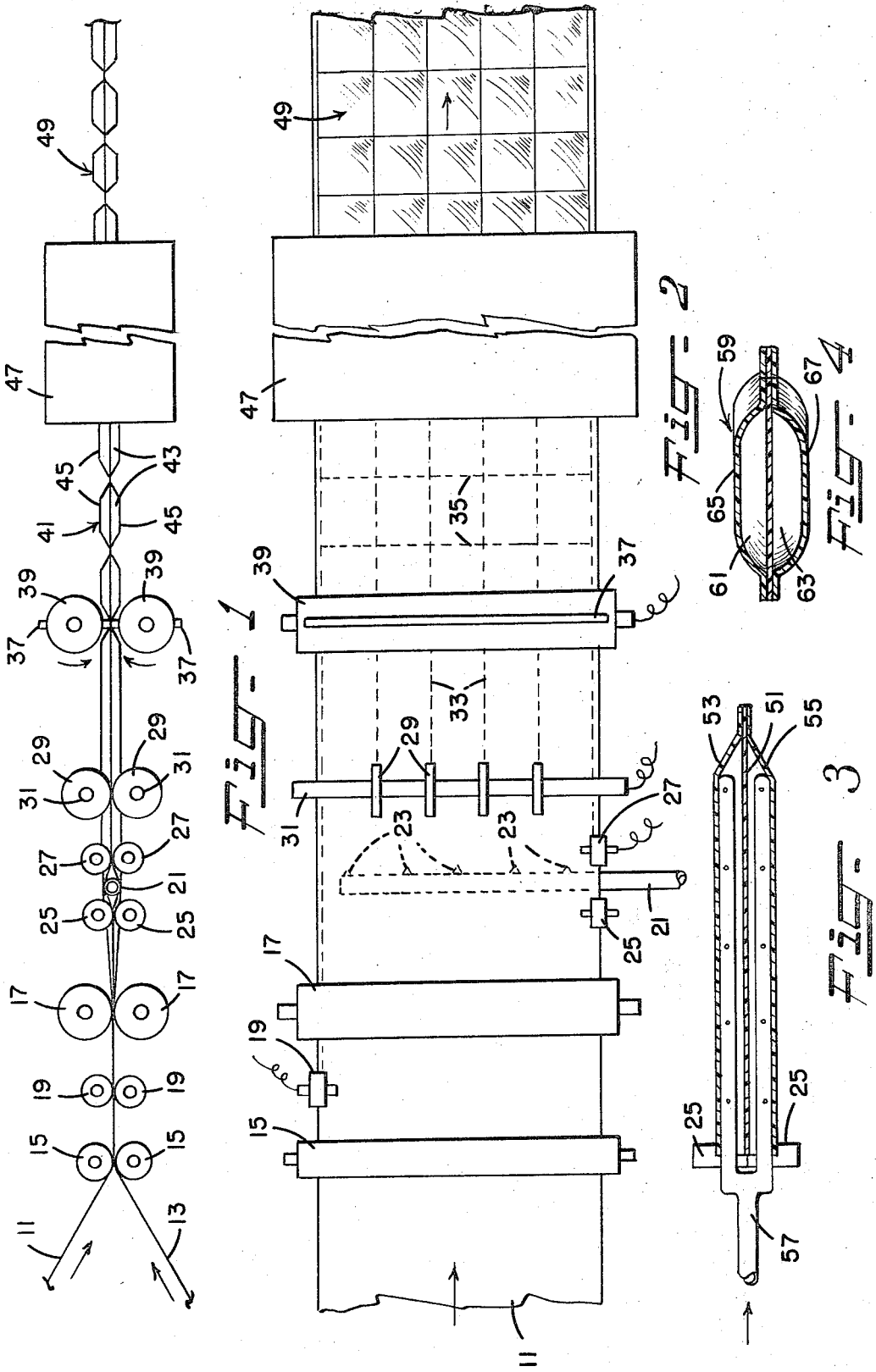

3,817,803
METHOD OF MAKING A CELLULAR CUSHIONING STRUCTURE
Eugene G. Horsky, Claymont, Del., assignor to FMC Corporation, Philadelphia, Pa.
Filed June 19, 1972, Ser. No. 264,231
Int. Cl. B29c 24/00
U.S. Cl. 156—85         11 Claims

ABSTRACT OF THE DISCLOSURE

A method of making a cellular cushioning structure having a plurality of spaced, hermetically sealed, pillow-shaped pockets within each of which is entrapped a fluid under pressure.

---

The present invention is directed to method of making a cellular cushioning structure.

U.S. Pats. 3,392,081; 3,415,711; 3,405,020; 3,514,362; 3,508,992; and 3,616,155 are representative of prior art disclosures relating to cellular cushioning material which in general includes a flat surface and a surface having a plurality of sealed embossments within which air is entrapped. Basically, such known cushioning materials are made by simply heating and applying a vacuum to a plastic film while it is engaged with the periphery of an embossing roller. With the now embossed film still engaged with such roller, a flat film is laminated to its exposed side to thereby entrap air within the embossments.

In the practice of the above described method, the alternate heating and cooling of the film during the embossing and laminating stages involves a rather slow and costly operation. Further, a separate, expensive embossing roller must be employed when a change in the embossment patern, size and/or shaping is desired. Accordingly, a primary object of the present invention is to provide for a generally new or improved and more satisfactory method for making a cellular cushioning structure.

Another object is to provide an improved method for making a cellular cushioning and thermal insulating structure having a plurality of independent hermetically sealed pockets, opposing walls of which are bowed away from each other and are maintained in a taut condition by a fluid under pressure entrapped within the respective pockets.

Still another object is to provide an improved method for making a cushioning structure having a fluid under a desired pressure entrapped within each of a plurality of independent, hermetically sealed pockets.

A further object is the provision of an improved, economical and simple method for making cellular cushioning structures.

These and other objects are accomplished in accordance with the present invention by a method in which a laminate of at least two flat overlying, flexible, fluid-impermeable, continuous plies is hermetically sealed along selected, continuous areas which define the peripheries of a plurality of individual pockets. Within these pockets is contained a fluid under pressure such that the unsealed areas of the overlying plies which form the outermost walls of the respective pockets are bowed away from each other and are in a taut condition. At least one of these overlying plies is a film formed of orientable thermoplastic polymeric material, with the unsealed areas of such film being in at least a partially shrunken condition from a molecularly oriented state.

The cellular cushioning structure may include more than two overlying plies and in such construction at least the outermost of the overlying plies are films formed of orientable thermoplastic polymeric material and are in at least a partially shrunken condition from a molecularly oriented state.

More particularly, in the method of the present invention, a fluid under a pressure greater than that of the ambient atmosphere is first contained between at least two overlapping, flexible, fluid-impermeable plies, with at least one of said plies being a film formed of thermoplastic polymeric material and having its molecules oriented at least along one of its axial directions. These overlapping plies are hermetically sealed along selected, continuous areas which define the peripheries of a plurality of individual pockets within which the contained fluid is entrapped. Thereafter, the unsealed areas of the molecularly oriented polymeric film are heated to effect at least partial shrinkage thereof.

Preferably, at least both of the outermost of the overlapping plies are films formed of thermoplastic polymeric materials in which the molecules are oriented either uniaxially or biaxially, desirably to the same degree. If uniaxially oriented films are employed, such orientation may extend in the same directions as at right angles to each other.

In structures employing more than two overlapping plies, intermediate plies may also be films formed of thermoplastic polymeric material which are unoriented or uniaxially or biaxially oriented. The degree to which such intermediate films are oriented may be the same as that of the outermost films and, if uniaxially oriented, the orientation may extend at substantially right angles to the direction of orientation existing in the outermost films.

Heating of the unsealed areas of the molecularly oriented polymeric films is preferably such as to provide for complete shrinkage thereof from its molecularly oriented state, without melting of such film. In this manner, the fluid entrapped within the respective pockets is snugly encased, with the outermost walls of such pockets being bowed away from each other and in a taut condition.

The cellular cushioning structure may be made by a continuous operation, for example, by overlapping successive portions of two separate but continuous, molecularly oriented thermoplastic polymeric films, sealing successive longitudinal edges thereof prior to or concomitantly with the delivery of a fluid under pressure therebetween, hermetically sealing the overlapping films along selected, continuous areas to define pockets within which is entrapped the fluid contained between such films, and thereafter heating the unsealed areas of such molecularly oriented films to effect shrinkage thereof.

In lieu of employing separate, continuous films in the above-described continuous operation, a tubular oriented thermoplastic polymeric film formed by a continuous extrusion process, as for example, as described in U.S. Pat. 3,555,603 may be slit along one longitudinal edge to deliver a fluid under pressure and then sealed and shrunk in a manner as described above.

Any thermoplastic polymeric material which can be oriented can be employed in the method of the present invention. Such thermoplastic polymeric materials include, for example, polyethylene, polypropylene, polyesters, nylon, polyvinyl cholride, polyvinylidene, etc. making cushioning structures having more than two plies, the intermediate plies may be formed of any continuous flexible sheet materials which themselves or coatings thereon may be sealed to each other and to the outermost plies by heat. Such intermediate plies need not be fluid-impermeable and may be formed, for example, from paper, cellophane fabrics, etc. Preferably, however, these intermediate plies are films formed of thermoplastic polymeric materials of the character described above. In such construction, the integrity of each pocket is independent of the others and thus a loss of fluid from one pocket by rupture of a wall thereof does not involve the escape from other of such pockets.

The fluid entrapped between the overlying plies is desirably a gas which will not react with the materials from which such plies are formed and, from the standpoint of economy and thermal insulating properties, air is preferred. If desired, this fluid, such as air, may be cooled below the temperature of the ambient atmosphere prior to its delivery in between the plies so that it exerts still greater pressure on the pocket walls as it expands upon assuming the temperature of the ambient atmosphere. The plies and/or the entrapped fluid may be colored for decorative purposes or to permit the resulting cushioning structure to serve some identifying function.

For the sake of simplicity, reference is hereafter made in the detailed description to the manufacture of cellular cushioning structures in which air is entrapped within pockets formed by hermetically sealing overlying films formed of thermoplastic polymeric films, the outermost of which are molecularly oriented to substantially the same degree in only a transverse direction.

In the drawing,

FIG. 1 is a diagrammatic side view of the apparatus as employed in practicing the method of the present invention;

FIG. 2 is a plan view of the apparatus shown in FIG. 1;

FIG. 3 is a fragmentary view illustrating a portion of an apparatus for making a modified cushioning structure; and FIG. 4 is a vertical section taken through a portion of the modified cellular cushioning structure using the apparatus shown in FIG. 3.

As illustrated in FIGS. 1 and 2, in practicing the method of the present invention, a pair of flat, continuous films 11 and 13 are drawn from suitable supply sources, such as rolls, not shown, overlapping as they enter inbetween nip rolls 15 and are then advanced inbetween nip rolls 17. The films 11 and 13 are alike, with each being formed of thermoplastic polymeric material, such as polypropylene, in which the molecules are oriented to substantially the same degree in only the transverse direction thereof.

The pairs of nip rolls 15 and 17 are driven at substantially the same rate of speed by suitable means and, during travel between such pairs of rolls, one pair of longitudinal edges of the overlapped films 11 and 13 are sealed together, as by cooperating electrically heated rollers 19.

Beyond the nip rolls 17, an elongated nozzle 21 extends inbetween the unsealed longitudinal edges of the overlapped films 11 and 13, in a direction generally perpendicular to the direction of film travel. Compressed air is delivered into the nozzle 21 and is discharged therefrom and inbetween the overlapped films 11 and 13 through a plurality of nozzle jets 23 which open in the direction of film travel. A pair of rollers 25 nip the unsealed longitudinal edges of the film 11 and 13 as they approach the nozzle 21 and a pair of electrically heated rollers 27 seal such longitudinal edges immediately after they are advanced beyond such nozzle. With this arrangement, the escape of air from between the overlapped films is at least minimized and, if desired or necessary, the nip rollers 25 may extend across the entire width of such films.

A series of like electrically heated discs 29 are fixed at like spaced intervals to shafts 31 and together serve to continuously bond the overlying films 11 and 13 at laterally spaced intervals, as indicated at 33, as such films are advanced relative thereto. With continued advancement, the overlying films are sealed across the width thereof at longitudinal spaced intervals thereof, as indicated at 35, by electrically heated plates 37 which project beyond the peripheries of rolls 39.

At this stage the product 41 has a cellular structure with the air originally delivered inbetween the films 11 and 13 being entrapped within individual pockets 43, the peripheries of which are defined by the sealed film areas 33 and 35. The unsealed film areas 45 form the opposing walls of the respective pockets 43 and, at this stage, such walls 45 may exhibit some slack.

Accordingly, in the method of the present invention, the cellular product 41 is advanced continuously into and through an oven 47 within which the unsealed, molecularly oriented film areas 45 are rapidly heated to only such degree as to effect shrinkage thereof. The temperature to which the product 41 is heated at this stage will depend upon such factors as the particular thermoplastic material employed, the extent to which the original films 11 and 13 were oriented and the degree of shrinkage desired. Heating at this stage is effected rapidly and is of short duration so that the air entrapped within the pockets experiences little or no expansion. Care must be exercised, however, to avoid melting of any areas of the product 41.

The continuous cushioning structure 49 issuing from the oven 47 is cooled by the ambient atmosphere and collected by suitable means, not shown. As a result of the film shrinkage which occurs within the oven 47, any slack which may have heretofore been present along the pocket walls 45 is removed. The volume of each pocket 43 is thus reduced, causing the air entrapped therein to be compressed, preferably to such degree as to maintain the walls of each such pocket in a taut condition.

Desirably, the discs 29 are releasably keyed to the respective shafts 31 and separated by spacers so as to permit the number of such discs to be varied. In this manner the size of the pockets 43 may be changed to suit particular requirements. Variation in the sizes of the pockets 43 may also or alternatively be achieved by substituting rolls 39 having a greater number of radially extending sealing plates 37.

The above described method may be modified slightly to adapt the same for making cellular cushioning structures having more than two overlying plies. For example, an unoriented film 51 overlapped on both sides by uniaxially oriented films 53 and 55 may be sealed together along one longitudinal edge thereof by the heated rollers 19 as such films are advanced between the pairs of nip rolls 15 and 17, after which compressed air may be contained between each pair of opposing films. As shown in FIG. 3, this last mentioned step can be achieved by simply using a forked nozzle 57 whereby air is simultaneously delivered inbetween the opposing films as they travel between the pair of nip rolls 25 and the heated edge sealing rollers 27. Once this air delivery is completed, the overlying films are sealed longitudinally and transversely and are then heated to effect desired film shrinkage in a manner as heretofore described with reference to FIGS. 1 and 2.

The cellular cushioning structure provided by this modified procedure is indicated at 59 in FIG. 4 and includes independent pockets 61 and 63 in which the outermost walls 65 and 67 are maintained in taut condition by the air entrapped within the respective pockets. In this structure, the unsealed areas of the intermediate film 51 are walls common to the opposing pockets 61 and 63. Thus rupture of the outermost wall of either of such pockets will not affect the integrity of the other of such overlying pockets.

In the above described methods, sealing of the overlying films along longitudinal and transverse directions need not be effected in separate stages but may be achieved simultaneously, for example, by passing such films inbetween a pair of rollers having spaced longitudinal and peripheral ribs. In addition, sealing of such film need not extend along axial directions of the overlying films but may extend at angles thereto, as for example, along intersecting diagonal paths.

It is to be understood that changes and modifications may be made without departing from the spirit and scope of the invention as defined in the appended claims.

I claim:

1. A method of making a cellular cushioning structure including the steps of containing a fluid between at least two overlapping, flexible, fluid-impermeable plies, which is under a pressure greater than that of the ambient atmosphere, at least one of said plies being a film formed of thermoplastic polymeric material and having its molecules oriented at least along one of its axial direcitons, hermetically sealing the overlying plies along selected, continuous areas which define the peripheries of a plurality of individual pockets within which the contained fluid is entrapped, and thereafter heating the unsealed areas of the molecularly oriented thermoplastic polymeric film to effect at least partial shrinkage of such areas to render the same taut and place the entrapped fluid under a desired pressure.

2. A method as defined in claim 1 wherein said fluid is a gas.

3. A method as defined in claim 2 wherein only two overlapping plies are employed, and wherein both of said plies are formed of thermoplastic polymeric material in which the molecules are oriented at least along one axial direction thereof.

4. A method as defined in claim 3 wherein said films are molecularly oriented in the same directions and to substantially the same degree.

5. A method as defined in claim 3 wherein said films are uniaxially oriented, with the orientation along one of the films being at substantially right angles to the orientation along the other of the films.

6. A method as defined in claim 4 wherein said films are biaxially oriented.

7. A method as defined in claim 2 wherein the fluid contained between each pair of a series of pairs of overlapping plies, with at least the two outermost of such plies being films formed of thermoplastic polymeric material and having their molecules oriented at least along one of the axial directions thereof.

8. A method as defined in claim 7 wherein the intermediate of the overlapping plies is an unoriented film formed of thermoplastic polymeric material.

9. A method as defined in claim 7 wherein said polymeric films are molecularly oriented in the same directions and to substantially the same degree.

10. A method as defined in claim 7 wherein the intermediate of the overlapping plies is a biaxially oriented film formed of thermoplastic polymeric material.

11. A method as defined in claim 10 wherein the two outermost polymeric films are uniaxially oriented in the same directions and substantially to the same degree.

References Cited

UNITED STATES PATENTS

| 3,575,757 | 4/1971 | Smith | 156—145 |
| 3,087,845 | 4/1963 | Patterson | 156—85 |
| 3,551,540 | 12/1970 | Pellicciari et al. | 264—230 |
| 3,366,523 | 1/1968 | Weber | 156—145 |
| 3,660,189 | 5/1972 | Troy | 156—145 |

CHARLES E. VAN HORN, Primary Examiner

F. FRISENDA, Jr., Assistant Examiner

U.S. Cl. X.R.

156—145, 156, 160, 285, 299; 161—122, 139

UNITED STATES PATENT OFFICE
CERTIFICATE OF CORRECTION

Patent No. 3,817,803     Dated June 18, 1974

Inventor(s) Eugene G. Horsky

It is certified that error appears in the above-identified patent and that said Letters Patent are hereby corrected as shown below:

Col. 4, lines 73-75, delete "which is under a pressure greater than that of the ambient atmosphere".

Signed and Sealed this thirtieth Day of March 1976

[SEAL]

Attest:

RUTH C. MASON
Attesting Officer

C. MARSHALL DANN
Commissioner of Patents and Trademarks